United States Patent [19]

Hutchinson

[11] 4,093,104
[45] June 6, 1978

[54] RUBBER DIAPHRAGM TYPE DOOR LOCKING MECHANISM

[75] Inventor: John W. Hutchinson, Erie, Pa.

[73] Assignee: American Sterilizer Company, Erie, Pa.

[21] Appl. No.: 717,918

[22] Filed: Aug. 26, 1976

[51] Int. Cl.² ............................................ B65D 45/00
[52] U.S. Cl. ............................. 220/316; 220/DIG. 20
[58] Field of Search ................. 92/99; 220/316, 89 A, 220/DIG. 20; 292/257, 6, 42, 39, 51

[56] References Cited

U.S. PATENT DOCUMENTS

| | | | |
|---|---|---|---|
| 1,659,202 | 2/1928 | Jewell | 220/316 |
| 1,711,803 | 5/1929 | Munday | 92/99 |
| 1,858,013 | 5/1932 | Heins | 220/316 |
| 2,123,662 | 7/1938 | Raymond | 220/89 A |
| 2,220,902 | 11/1940 | Hastings et al. | 92/99 |
| 2,396,005 | 3/1946 | Gross et al. | 220/81 R |
| 2,418,614 | 4/1947 | Annin | 92/99 |
| 2,605,957 | 8/1952 | Houston | 92/99 |
| 2,762,394 | 9/1956 | Hastings | 92/99 |
| 3,491,700 | 1/1970 | Phillips et al. | 92/99 |

*Primary Examiner*—William Price
*Assistant Examiner*—Allan N. Shoap

[57] ABSTRACT

A locking mechanism for a door of an autoclave made up of a vent plate, a diaphragm, and a seat and a pressure plate that engages a locking mechanism on the side of the diaphragm remote from the pressure side.

The seat has a counterbore adjacent to its inner edge defining a shoulder. The diaphragm is clamped to the seat outwardly of the counterbore and the pressure plate can move into engagement with the flat surface defined by the counterbore when gas is under pressure in the chamber forcing the pressure plate against the door locking mechanism. The surface of the seat between the outer flat surface and the shoulder is contoured providing a smooth surface for the diaphragm to engage.

2 Claims, 5 Drawing Figures

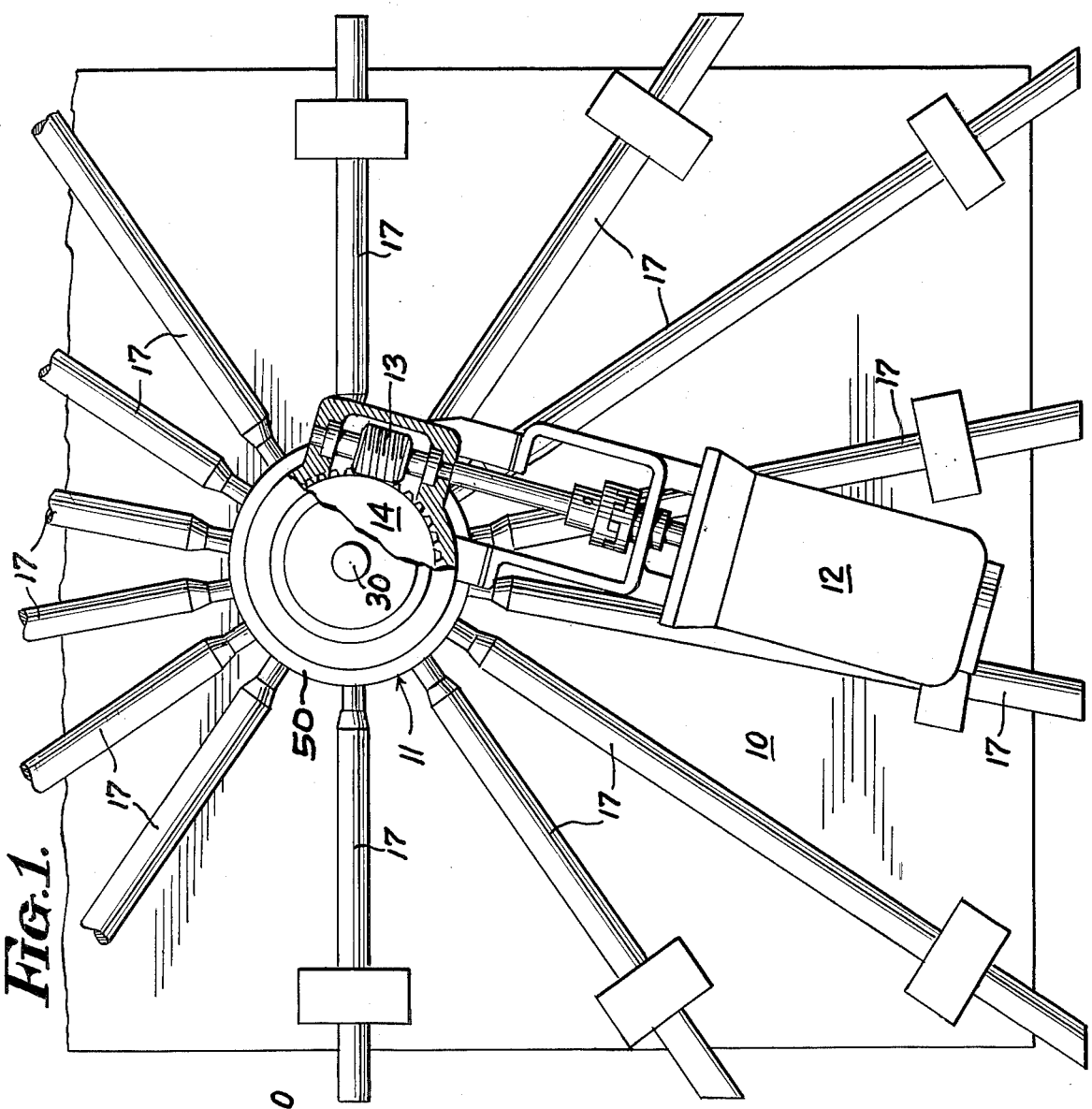
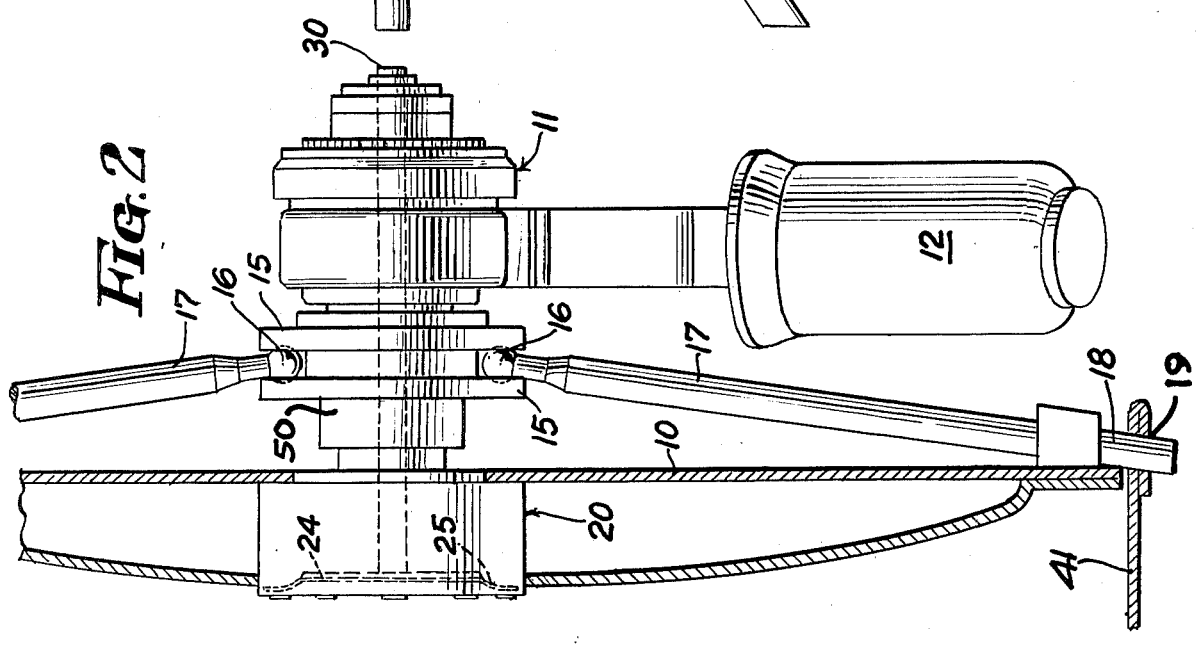

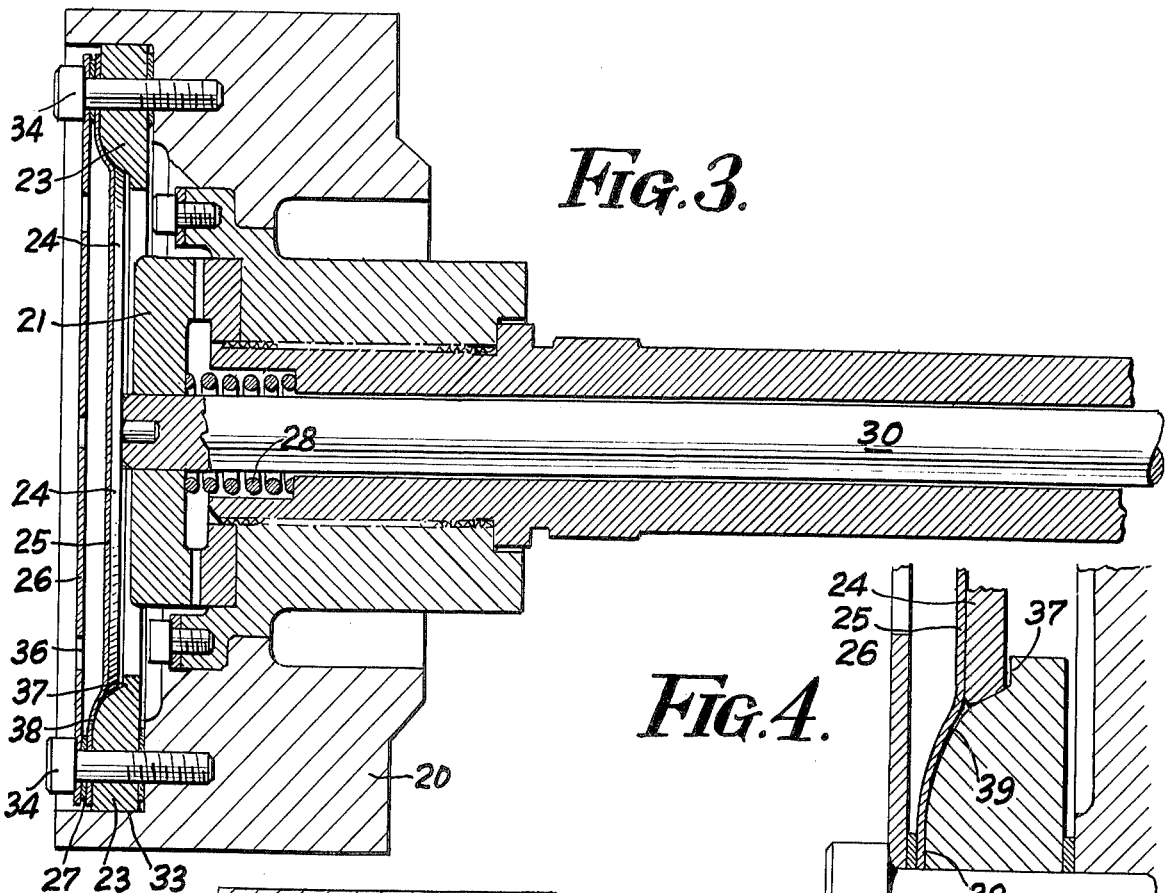
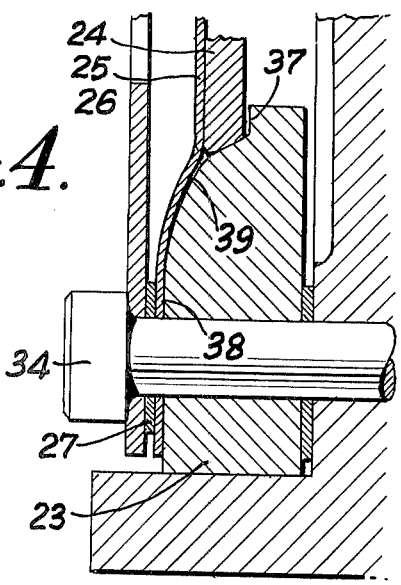
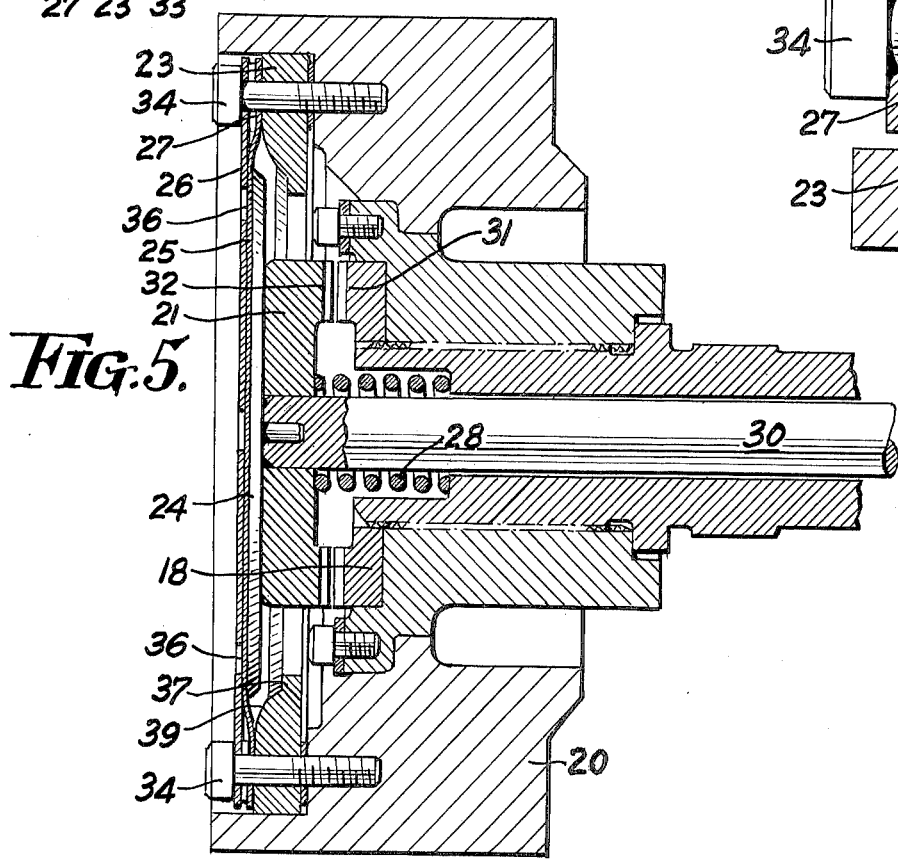

RUBBER DIAPHRAGM TYPE DOOR LOCKING MECHANISM

GENERAL STATEMENT OF INVENTION

The present invention involves utilizing rubber reinforced with fabric to separate the pressure from the nonpressure side of a door locking mechanism. To protect this rubber diaphragm from tearing, when subjected to pressures up to 55 psi or vacuums to 15 psi, a pressure plate that presents a flat smooth surface after reaching a pressure of 1 to 2 psi is utilized. Also, diaphragm movement is controlled to minimize stress on the rubber which in turn prolongs the diaphragm life. The diaphragm moves over center of the mounting surface approximately 0.75 inches on each side which is enough movement to fully engage the lock clutch. Vent holes in the vent plate are small enough in diameter to prevent vacuum from forcing the diaphragm in the holes and reduce diaphragm life. Locking and unlocking pressures are controlled by the diameter of the pressure plate and the spring. Once established, this pressure will remain constant.

REFERENCE TO PRIOR ART

The rubber diaphragm has been used in the past on low pressure gas sterilizers only. The present design permits the use of a rubber diaphragm on all of the existing sterlizers of the autoclave variety when operating to the pressures referred to above. This design provides a standard locking device that is reliable at higher pressure, is economical and repeatable for lock and unlock pressures.

OBJECTS OF THE INVENTION

It is an object of the invention to provide an improved door locking mechanism.

Another object of the invention is to provide a door locking mechanism that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 1 is a front view of a door having a locking mechanism thereon according to the invention.

FIG. 2 is a view partly in cross section showing a door having a locking mechanism supported thereon.

FIG. 3 is a partial cross section of the locking mechanism.

FIG. 4 is an enlarged view of a part of the locking mechanism.

FIG. 5 is an enlarged partial view of the locking mechanism shown with the mechanism disengaged.

DETAILED DESCRIPTION OF DRAWINGS

Now, with more particular reference to the drawings, the door 10 is of the type frequently used to close autoclaves or pressure vessels used as steam sterilizers or gas sterilizers. The door 10 is supported on the autoclave chamber 41. The door has a central ring which supports the inner ends of the radiating arms 17 which have spherical inner ends received in a groove in the ring 50 between flanges 15. The gear 14 is attached to the ring 50 and rotates it. Motor 12 drives the worm wheel 13 which rotates the worm gear 14 which in turn rotates body 20 13 to force the arms inward in the manner referred to in U.S. Pat. No. 1,659,202 thereby withdrawing arms 17 from openings 19 in the chamber 41 or to retract the arms out of openings 19 thereby allowing the door to open.

In order to hold the gear 14 against rotation to prevent accidental opening of the door when the pressure exists in the chamber the lock mechanism body 20 is provided. The lock mechanism body 20 is shown in greater detail in FIGS. 3, 4, and 5. The lock mechanism body 20 is fixed to the door 10. Lock mechanism body 20 is counterbored at 33 and the counterbore receives annular seat 23, diaphragm 25, and vent plate 26 and an annular spacer 27. The studs 34 extend through spaced holes in the seat 23, diaphragm 25, and vent plate 26 providing sandwiching. Thus, the diaphragm 25 is clamped between the flat first side surface 38 on the seat 23 and the spacer 27 outwardly of the counterbore 33.

The diaphragm moves over center of the mounting surface approximately .75 inches on each side which is enough movement to fully engage the lock clutch having teeth 31 thereon which cooperate with the teeth 32 on the postlock head 21 which is fixed to the postlock post 30 which in turn extends through the bore in lock body 20. The vent holes 36 in the vent plate 26 are small enough in diameter to prevent vacuum from forcing the diaphragm 25 into the holes and thus reduce diaphragm life. Locking and unlocking pressures are controlled by the diameter of the plate. The contoured surface 39 between flat second side surface 38 and bottom surface 37 provides a smooth, even surface to support the diaphragm and prevent tearing.

The seat is counterbored terminating in a bottom surface 37. The bottom surface 37 has a flat surface on which the pressure plate 24 rests when gas under pressure in the chamber enters the opening in the vent plate 26 exerting a force on the diaphragm. The pressure plate 24 engages the post lock 21 into engagement with the teeth 31 thereby preventing the shaft 30 from rotating in the inner member 32 thereby holding the gear against rotation.

The door locking mechanism includes the cylindrical body lock 20, annular seal 23, diaphragm 25, and postlock having the post 30 and the postlock head 21. The body is attached to the door 10. The annular seat 23 has a first side surface 44 and a second flat side surface 38 and it is bored and counterbored forming the flat bottom surface 37 that lies in a plane parallel to the surfaces 44 and 45. The surface 39 forms a continuation of the surface 38 and terminates at the bottom surface 37. The flexible diaphragm 35 rest on the second surface 45 and is clamped thereto by the vent plate 26 and vent plate 26 is clamped to the diaphragm holding the diaphragm in sealed relation to the seat 23 by means of the studs 34. When there is a fluid under pressure in the chamber 41, it will exert a force on the diaphragm forcing the pressure plate 24 into engagement with the bottom 37 and curved surface 35 forcing the teeth 32 on the postlock head into locking engagement with teeth 31 on the lock body 20 thereby preventing the post 30 from rotating. The post 30 is connected to the work gear 14. Therefore, the teeth being intermeshed, the work gear cannot be rotated to release the arm 17 so long as the pressure is maintained in the fluid in chamber 41.

The foregoing specifications sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A door locking mechanism for a pressure vessel having a door (10), to prevent opening of the door (10) when gas in said chamber (41) is under pressure on a pressure side of said door comprising, a lock body (20) received in an opening in said door (10) and fixed to said door (10), a shaft (30) extending through said opening in said door (10) and adapted to engage a lock on the outside of said door (10), first teeth (31) on said lock body (20), means (21) supporting second teeth (32) on said shaft (30) overlying said first teeth (31) on said lock body (20), a pressure plate (24), said means on said shaft engaging said pressure plate (21), an annular seat (23) supported on said lock body (20) and having a first flat surface on the side remote from said lock body (20), said annular seat (23) having a bore therethrough and a counterbore of said bore terminating in a second flat surface (37) surrounding said bore, said second flat surface being spaced outwardly relative to said vessel from said first flat surface, said pressure plate (24) being disposed in said counterbore and adapted to rest on said second flat surface (37), a diaphragm (25) overlying said counterbore and resting on said pressure plate (24) and on said first flat surface (23), means sealing said diaphragm (25) to said first flat surface of said seat (23) providing a closure for said bore and said counterbore, said counterbore in said seat (23) being defined by an annular contoured surface (39) inclined from said first flat surface and terminating at said second flat surface (37) and said contoured surface and said pressure plate being adapted to provide a smooth, continuous surface for supporting said diaphragm (25) when a gas under pressure in said vessel forces said diaphragm and in turn said pressure plate outwardly towards said second flat surface to in turn force said second teeth into engagement with said first teeth whereby said shaft is restrained against rotation, thereby preventing said lock from being opened when a pressure exists in said chamber.

2. The door locking mechanism recited in claim 1 wherein a vent plate having vent openings therein is supported over said diaphragm on the side thereof remote from said seat and space bolts extend through said vent plate through said diaphragm and said seat holding said vent plate, diaphragm and seat through said lock body.

* * * * *